United States Patent
Chen et al.

(10) Patent No.: US 7,251,578 B1
(45) Date of Patent: Jul. 31, 2007

(54) METHOD AND SYSTEM OF MEASURING DATA QUALITY

(75) Inventors: Peiji Chen, Saratoga, CA (US);
Long-Ji Lin, San Jose, CA (US);
Jagannatha Narayanareddy, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 11/373,701

(22) Filed: Mar. 10, 2006

(51) Int. Cl.
*G06F 15/173* (2006.01)

(52) U.S. Cl. .................. 702/127; 702/81; 702/82; 702/84; 702/182; 702/185; 702/186; 709/230; 709/231; 709/223; 709/205

(58) Field of Classification Search ............ 702/81, 702/82, 84, 182, 185, 186, 127; 709/230, 709/231, 223, 205, 232, 233
See application file for complete search history.

(56) References Cited

U.S. PATENT DOCUMENTS

| | | | |
|---|---|---|---|
| 5,835,627 A * | 11/1998 | Higgins et al. | 382/167 |
| 6,169,934 B1 * | 1/2001 | Nakayama et al. | 700/213 |
| 7,050,938 B1 * | 5/2006 | Prater et al. | 702/182 |
| 7,167,484 B2 * | 1/2007 | Liang et al. | 370/445 |
| 2002/0152305 A1 * | 10/2002 | Jackson et al. | 709/224 |
| 2003/0101253 A1 * | 5/2003 | Saito et al. | 709/223 |
| 2003/0126234 A1 * | 7/2003 | Shachar et al. | 709/220 |
| 2005/0091505 A1 * | 4/2005 | Riley et al. | 713/182 |
| 2005/0163060 A1 * | 7/2005 | Riley et al. | 370/254 |
| 2006/0072708 A1 * | 4/2006 | Warner et al. | 379/1.03 |
| 2006/0195556 A1 * | 8/2006 | Shamia et al. | 709/220 |

* cited by examiner

*Primary Examiner*—Carol S. W. Tsai
(74) *Attorney, Agent, or Firm*—James J. DeCarlo; Greenberg Traurig LLP

(57) ABSTRACT

Data quality measurement is provided for use in a data processing stream, which comprises at least one upstream data processing system and at least one downstream data processing system. An input alert component can be used to provide a measurement of data prior to its input to a data processing system (e.g., a downstream data processing system or an upstream data processing system). An output alert component can be used to provide a measurement on data output by a data processing system. A self-consistency component can be used to measure consistency between items of input, or output data. An end-to-end component can be used to measure data quality using data items from both input data and output data. These components can be used in some combination, or independent of the other, and in any order. In addition, the data quality measurements can be performed separate from that processing performed by either the upstream or downstream processing system.

26 Claims, 14 Drawing Sheets i. Get the daystamp (e.g., in yyyymmdd format) from the command line, which is referred to as daystamp.
ii. Compute the day corresponding to the previous week (daystamp-7). Let us call this prevweek_daystamp (e.g., in yyyymmdd format).
iii. Obtain the maximum threshold to be tolerated from, for example, the configuration file. Let us call this maximum_threshold. Or, a default value, such as can be 0.1 or 10%, can be used when the maximum threshold is not set by configuration information.
iv. Obtain a maximum holiday threshold to be tolerated when either daystamp or prevweek_daystamp is a holiday. This value can be obtained from configuration information, for example. This value is referred to as a maximum_holiday_threshold. Or, a default value, such as e.g., 0.25 or 25%, can be used when a value is not set in the configuration information.
v. Obtain the list of holidays from holiday configuration information (n.b., holidays vary across geographic regions, for example). This list can be referred to as list_of_holidays. The contents can be in form yyyymmdd, for example.
vi. If either daystamp or prevweek_daystamp happens to be a holiday (e.g., present in the list_of_holidays) then use the maximum_holiday_threshold. Otherwise, use the maximum_threshold.
vii. For the data, or some predetermined portion thereof, do the following:
   1. Find the size of the data file corresponding to the bucket_number, which size is referred to as current_file_size
   2. Find the size of the previous week's data file corresponding to the bucket_number, which size is referred to as previous_file_size.
   3. Compute the deviation absolute(previous_file_size-current_file_size)/previous_file_size, referred to as deviation_in_file_size.
   4. Make sure the deviation_in_file_size is less than the specified threshold. Otherwise, send notification of exception, as notification of the deviation. In addition or as an alternative, such an exception can result in termination of data quality measurement.

Figure 7A i. Get the daystamp (e.g., in yyyymmdd format) from the command line, which is referred to as daystamp.
ii. Compute the day corresponding to the previous week (daystamp-7). Let us call this prevweek_daystamp (e.g., in yyyymmdd format).
iii. Obtain the maximum threshold to be tolerated from, for example, the configuration file. This value is referred to as a maximum_threshold. Or, a default value, such as 0.5 or 50%, can be used when the maximum threshold is not set by configuration information.
iv. Obtain a maximum threshold to be tolerated when either daystamp or prevweek_daystamp is a holiday. This value can be obtained from configuration information, for example. Let us call this maximum_holiday_threshold. The default value, such as 0.50 or 50%, can be used when a value is not set in the configuration information.
v. Obtain a list of holidays from holiday configuration information (n.b., holidays vary across geographic regions, for example). This list can be referred to as list_of_holidays, and the contents can be in the form of yyyymmdd, for example.
vi. If either daystamp or prevweek_daystamp happens to be a holiday (e.g., present in the list_of_holidays) then use the maximum_holiday_threshold. Otherwise, use the maximum_threshold.
vii. For the data, or some predetermined portion of data, determine whether or not the deviation in the total pageviews, for that data portion, between prevweek_daystamp and daystamp is less than the specified threshold. Otherwise send notification of the exception, as notification of the deviation. This act is an early warning/spike detection system. If the notification is entered into a log, a user can view the log file entry, as notification of a potential problem.

Figure 7B

METHOD AND SYSTEM OF MEASURING DATA QUALITY

BACKGROUND

1. Field

This disclosure relates to data quality assurance, and more particularly to a system and method of monitoring and measuring quality of data processed by one or more data processing systems.

2. General Background

Computer networks are providing the ability to interconnect data processing systems so that the data output by one data processing system, an upstream system, can become the input to another data processing system, the downstream system. The downstream system is therefore dependent on the upstream system to produce quality data. One example of such a downstream system is a data warehouse, which captures and stores data from many different sources. A data warehouse becomes a repository of data, from which data can be retrieved for use by any number of downstream systems. In this example, if the data warehouse receives and stores erroneous data, the erroneous data can be proliferated to any number of downstream systems unaware of the questionable quality of the data. Typically, such an error is detected by an end user of the downstream system. This causes the end user to doubt the output produced by the downstream system.

Further and while a downstream system may be operating according to its specifications, it can still produce erroneous output due to the erroneous input data received from an upstream system. Conventionally, a downstream system may include some processing logic designed to check for errors resulting from its own processing. However, since the error was introduced by an upstream system and not by the downstream system's processing, the conventional downstream system's error checking will most likely be inadequate, which will cause error to go undetected by the downstream system.

Thus, it would be beneficial to be able to have reliance on the validity and accuracy of input data used by a data processing system, such as the input data received from an upstream system. In addition, it would be beneficial to be able to detect errors in the input data before it is processed by a downstream data processing system. Further still, it would be beneficial for a data processing system, such as an upstream system, to provide data of a quality which can be used by other data processing system. It would therefore be beneficial to be able to monitor and measure the quality of data input to and output by a data processing system.

SUMMARY

The present disclosure seeks to address failings in the art and to provide a method and system for monitoring and measuring data quality, and for detecting errors, or other inconsistencies, in data.

Data quality measurement is provided for use in a data processing stream, which comprises at least one upstream data processing system and at least one downstream data processing system. An input alert component performs a measurement of data to be input to a data processing system (e.g., a downstream data processing system or an upstream data processing system). An output alert component performs a measurement on data output by a data processing system. A self-consistency component measures consistency between items of input, or output data. An end-to-end component measures data quality using data items from both input data and output data. These components can be used in some combination, or independent of the other. In addition, the data quality measurements performed in one or more embodiments of the present disclosure can be performed separate from the processing performed by either the upstream or downstream processing system, and can provide data quality measurement in addition to, and independent of, of any upstream or downstream data processing system.

Embodiments of the present disclosure can be used, for example, to identify, and/or minimize the impact caused by, errors in data (input and/or output data) used by one or more data processing systems in a data processing stream, and/or errors related to processing the data. Embodiments of the present disclosure can be used to detect errors in data output by an upstream data processing system, even prior to the data's input to a downstream system, to provide a measurement of the quality of the data received from an upstream data processing system, for example.

As an example, a downstream data processing system can be a data warehouse, which captures and stores data from many different sources. Embodiments of the present disclosure can be used to perform data quality measurement on data, which can be received from any number of upstream data processing systems, before the data becomes part of the data repository managed by the data warehouse, thereby minimizing the proliferation of errors (e.g., missing or corrupt files/data fields, etc.) to downstream data processing systems.

In addition, data quality measurement provided in accordance with one or more embodiments of the present disclosure can provide ongoing data quality assurance testing for one or more data processing systems in a data processing stream, to facilitate identification of "bugs" in program code/logic, for example.

In addition, data quality measurement provided in accordance with one or more embodiments of the present disclosure can facilitate identification of errors in data resulting from, for example network/communication errors, corrupt files, malfunctioning hardware (e.g., disk/memory error, computing system error, etc.), abnormal program exit, system/application configuration errors, for example.

In accordance with at least one embodiment of the present disclosure, a data quality measurement method is provided for use in a data processing stream with at least one upstream data processing system, which outputs data for use by at least one downstream data processing system. Data processing by an upstream data processing system is validated prior to processing of the data by a data processing system downstream of the upstream data processing system, such that at least one property of the upstream data is validated. In addition, validation is performed on data processed by the downstream data processing system. Such validation includes validating at least one data item from the processed data using a predefined relationship between the at least one data item from the processed data and at least one data item from the upstream data, and validating two or more data items from the processed data using a predefined relationship between the two or more data items.

In accordance with one or more alternate embodiments of the disclosure, a method of monitoring data quality is provided. The method, which can be used with one or more computing systems, includes performing a pre-processing data quality measurement and a processed data quality measurement. The pre-pre-processing data quality measurement can be performed on input data using at least one property of the input data and a benchmark corresponding to the at least one property of the data. The processed data quality measurement can be performed on data resulting from processing the input data. The processed data quality measurement includes comparing at least one property of the resulting data with a benchmark corresponding to the at least one property of the resulting data, validating at least one resulting data item using a predefined relationship between the at least one resulting data item and at least one input data item, and validating two or more resulting data items using a predefined relationship between the two or more resulting data items.

DRAWINGS

The above-mentioned features and objects of the present disclosure will become more apparent with reference to the following description taken in conjunction with the accompanying drawings wherein like reference numerals denote like elements and in which.

FIG. 3, which comprises FIGS. 3A to 3E, provides a data quality analysis process flow in accordance with one or more embodiments of the present disclosure.

Figure 4:
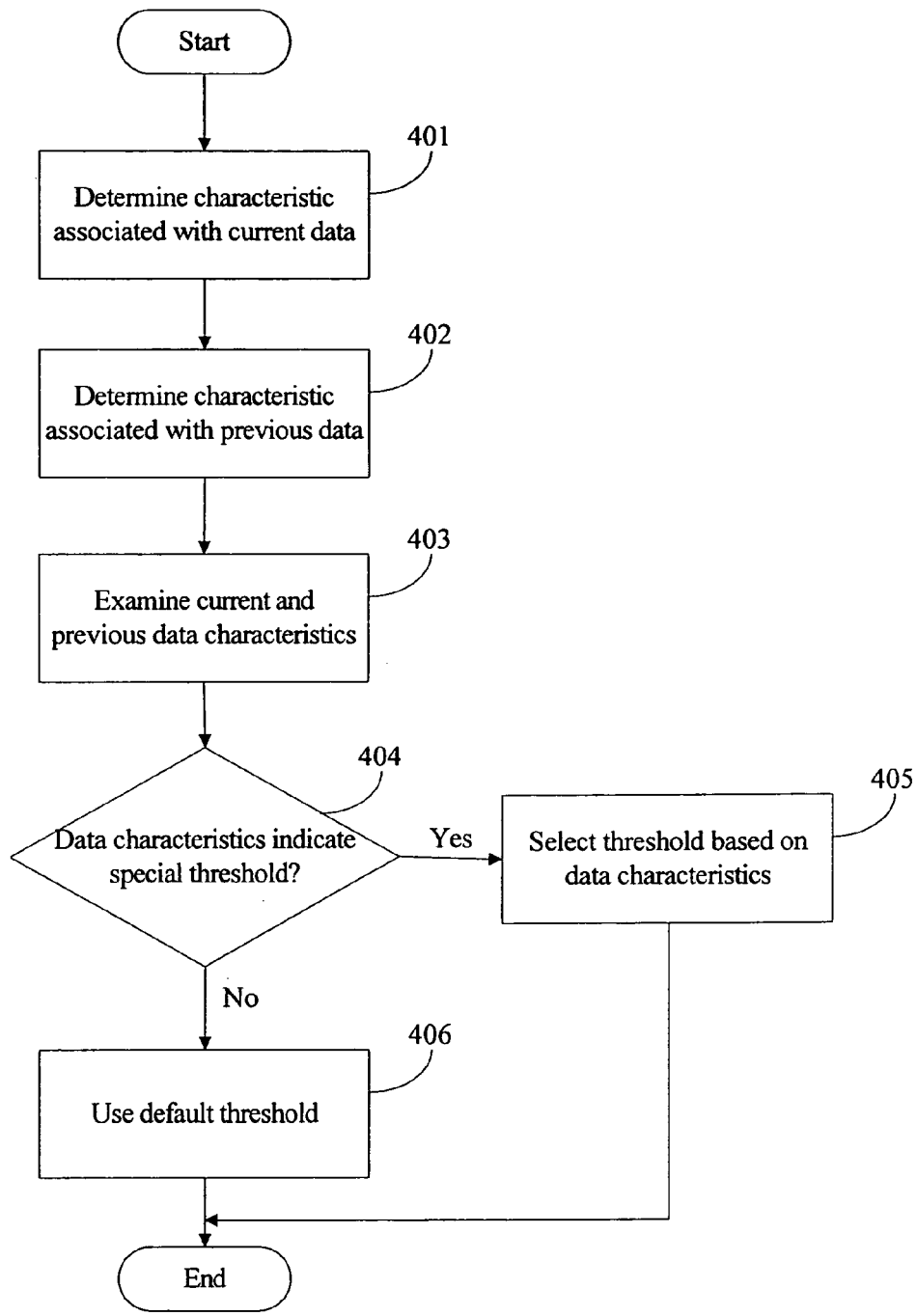

FIG. 4 provides an exemplary process flow for selecting a threshold based on at least one data characteristic in accordance with one or more embodiments of the present disclosure.

Figure 5:
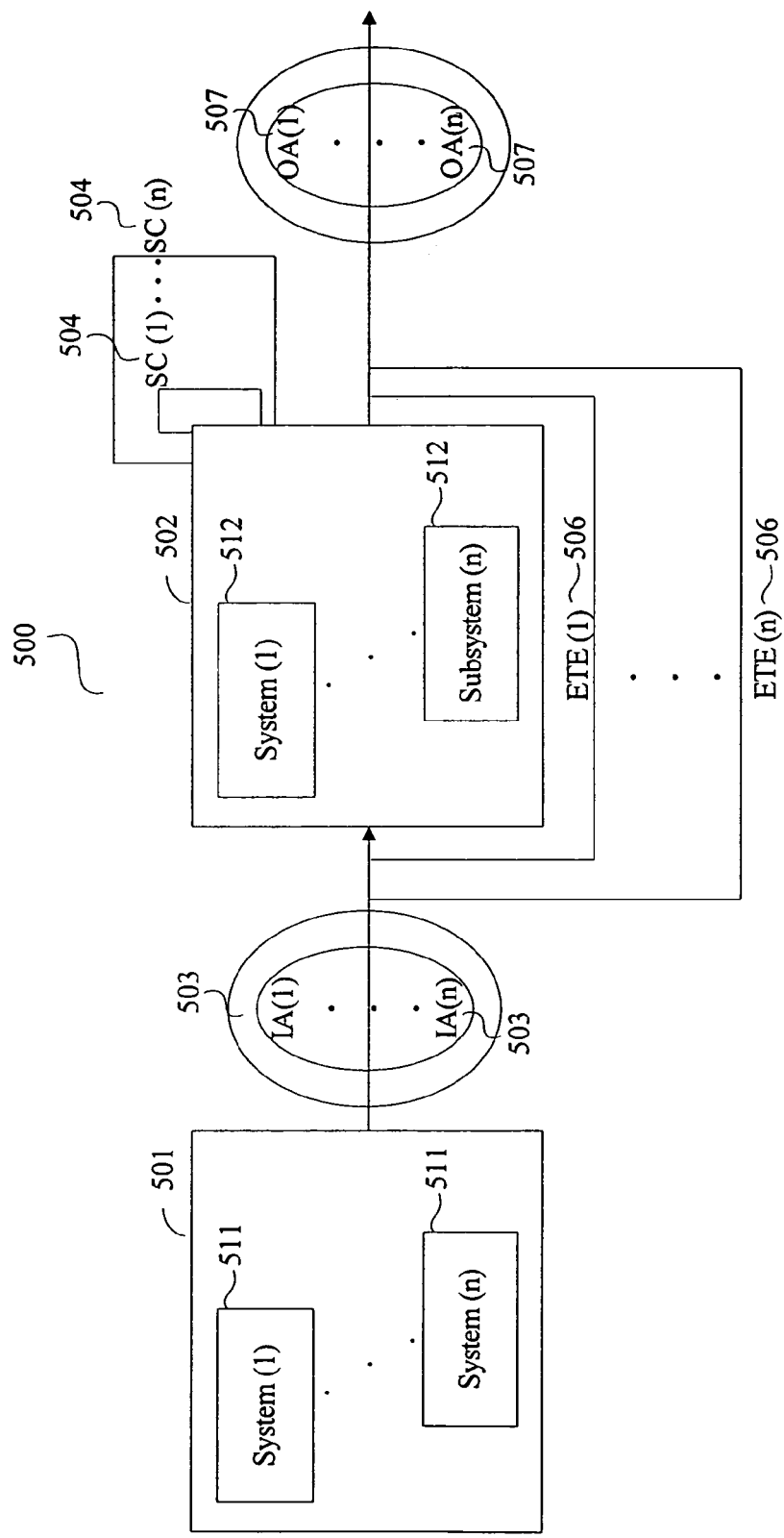

FIG. 5 provides a view of a data processing stream in accordance with one or more embodiments of the disclosure.

Figure 6A:
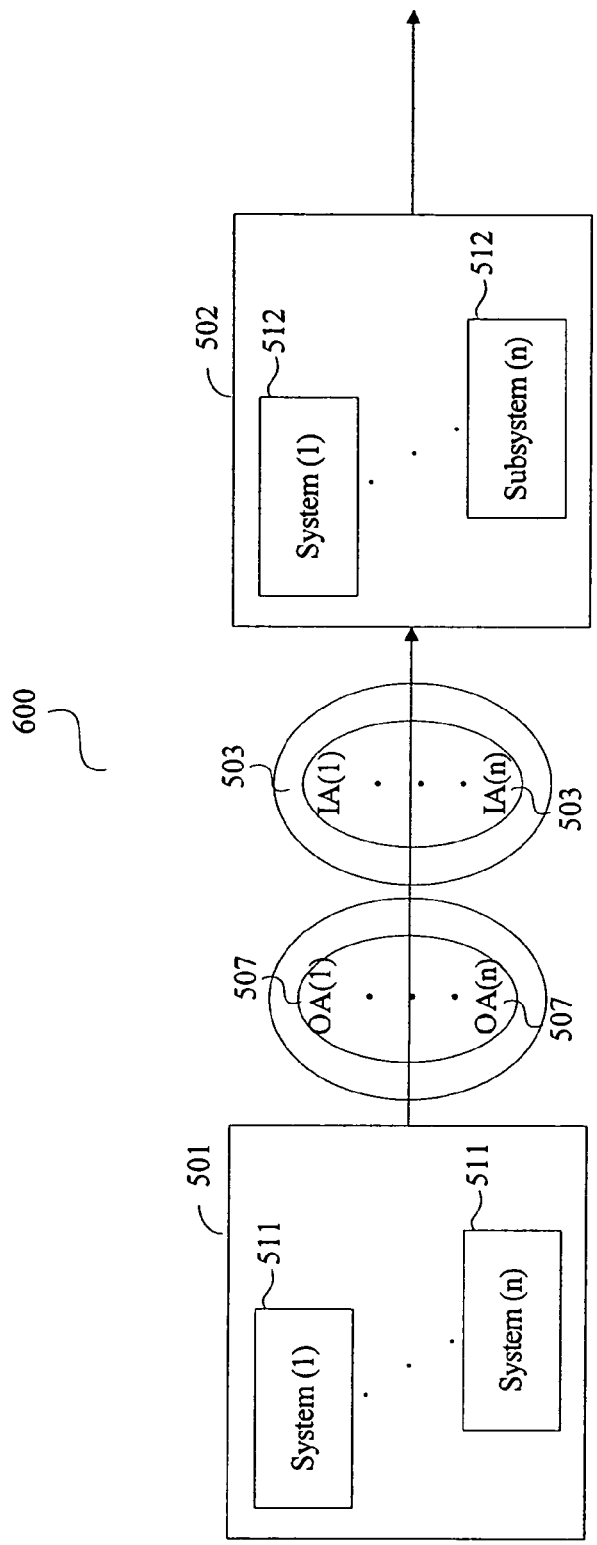
Figure 6B:
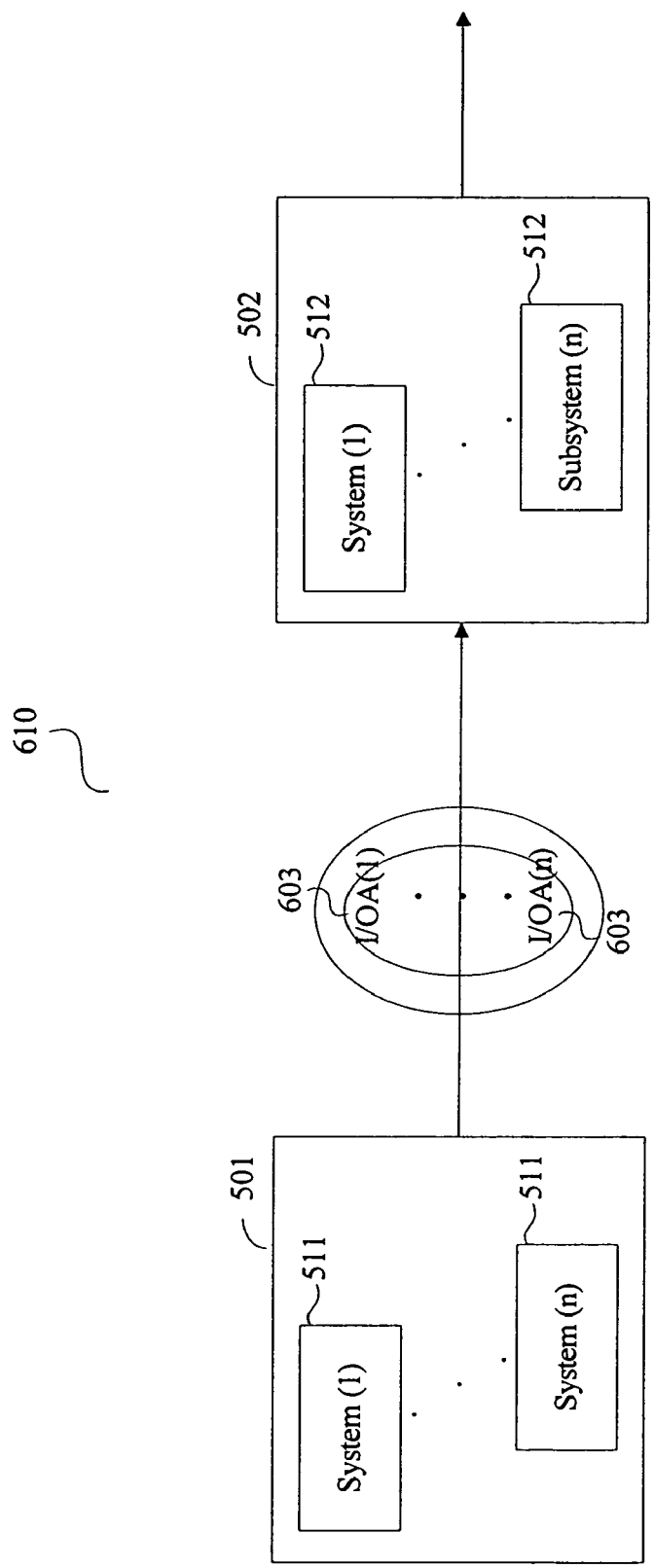
Figure 6C:
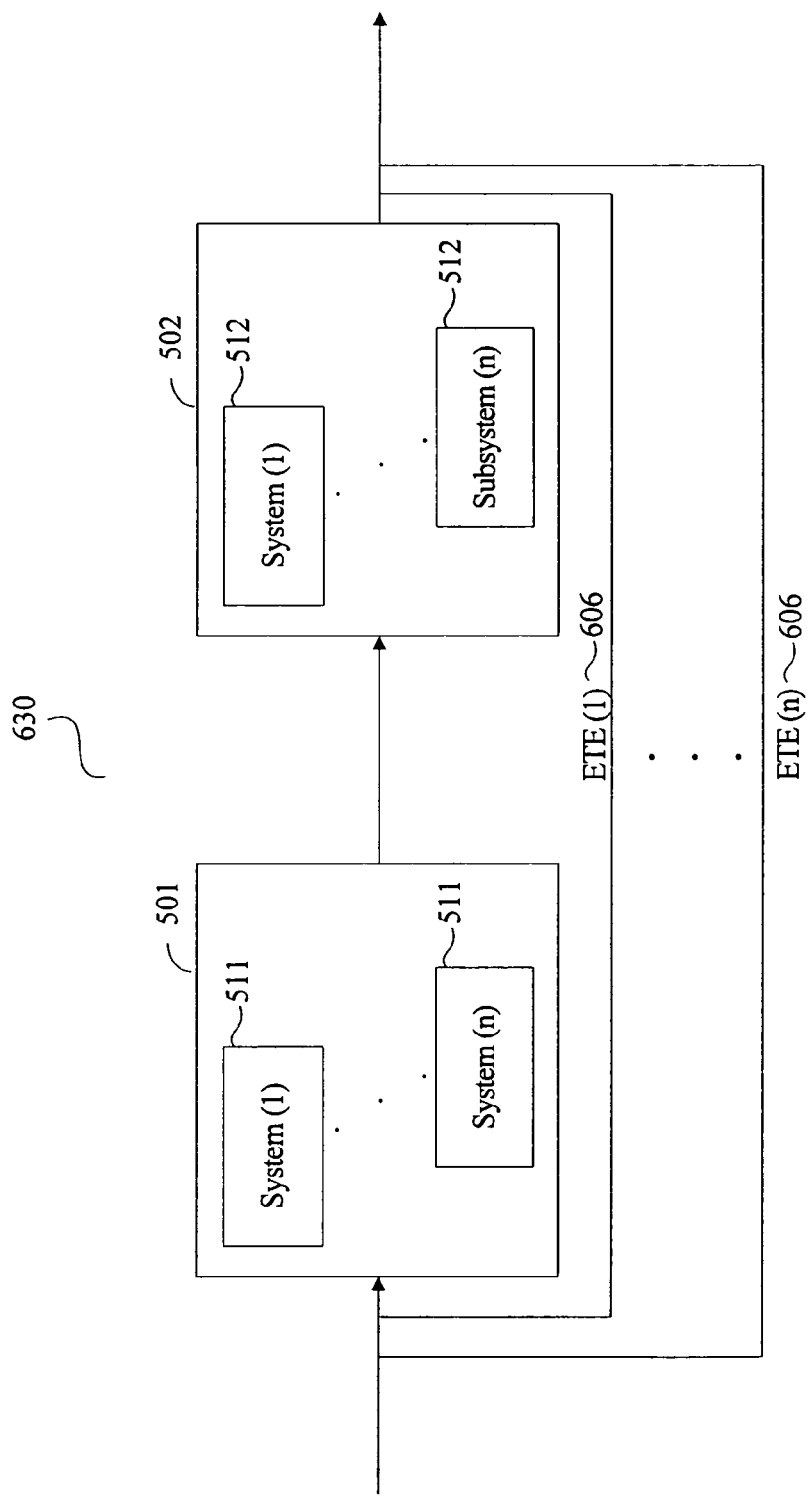

FIG. 6, which comprises FIGS. 6A to 6C, show data processing stream and/or data quality measurement arrangements in accordance with one or more alternate embodiments of the present disclosure.

FIG. 7, which comprises FIGS. 7A and 7B, provides pseudocode implementation exemplars in accordance with one or more embodiments of the present disclosure.

DETAILED DESCRIPTION

In general, the present disclosure includes a method and system for monitoring and measuring quality of data for processing by one or more data processing, or computing, systems.

Certain embodiments of the present disclosure will now be discussed with reference to the aforementioned figures, wherein like reference numerals refer to like components.

Figure 1:
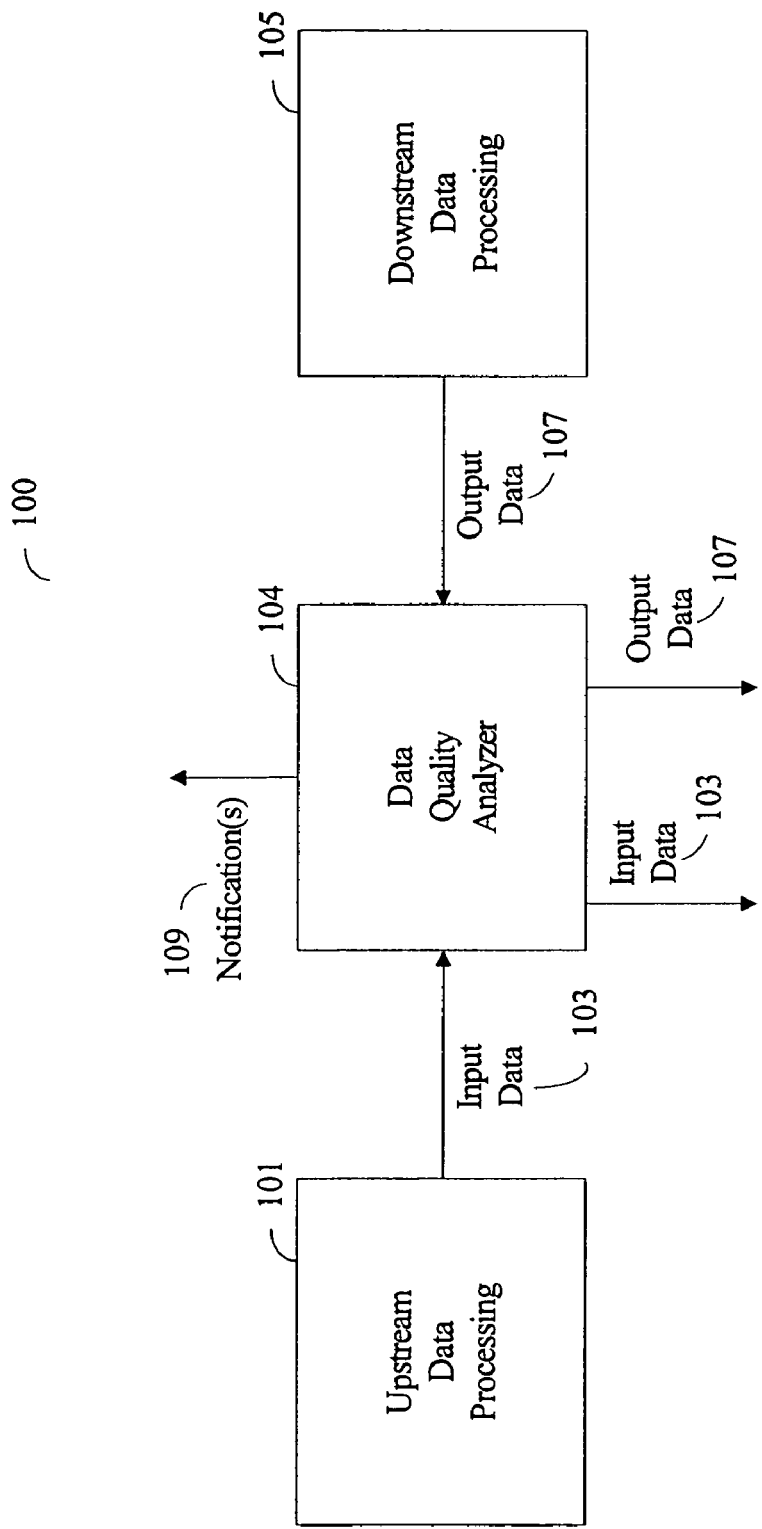
FIG. 1 illustrates a data processing stream and architecture for use with one or more embodiments of the present disclosure.

FIG. 1 illustrates a data processing stream and architecture for use with one or more embodiments of the present disclosure. In accordance with one or more embodiments, data processing stream 100 comprises upstream data processing system 101, which can comprise a number of data processing systems (or subsystems), and downstream data processing system 105, which can likewise comprise any number of data processing systems (or subsystems). In one or more embodiments, upstream data processing system 101 and downstream data processing system 105 are interconnected via a computer network, such as the Internet or a local area network, for example. Upstream data processing system 101 provides input data 103, which is to become input to downstream data processing system 105. In the example shown in FIG. 1, upstream data processing system 101 provides downstream data processing system 105 with input data 103 by way of a data quality analyzer (DQA) 104. DQA 104 includes functionality to monitor, collect and maintain information about, and to detect and measure quality of input data 103 and output data 107.

In accordance with one or more embodiments of the disclosure, DQA 104 is a discrete component, and separate from upstream data processing 101 and/or downstream data processing 105. More particularly, the data quality measurements performed by DQA 104 can be performed separate from the processing performed by either the upstream or downstream processing system, and can provide data quality measurement in addition to, and independent of, of any upstream or downstream data processing system. Alternatively, DQA 104 can be integral with a data processing system In the example shown in FIG. 1, DQA 104 receives input data 103 and output data 107 as input, and outputs notification(s) 109. In accordance with one embodiment, DQA 104 acts as a gatekeeper, such that DQA 104 determines whether input data 103 and/or output data 107 is to be forwarded to a data processing system in data processing stream 100.

DQA 104 can make such a determination based on the outcome of the data quality measurements performed by DQA 104, for example. Alternatively, DQA 104 can perform its data quality measurements, without acting as a gatekeeper for input data 103 and output data 107. In accordance with this alternative, input data 103 and output data 107 are forwarded to downstream processing 105 by upstream data processing 101 and downstream data processing 105, respectively, for example. Notification(s) 109 can be output by DQA 104 regardless of whether DQA 104 acts as a gatekeeper. Notification(s) 109 can be sent to upstream data processing 101, downstream data processing 105, another data processing system, and an operator, for example. In a case that DQA 104 is not a gatekeeper, notification(s) 109 can be sent to downstream data processing 105 for use in determining whether or not to process input data 103, for example.

In the example of FIG. 1, DQA 104 receives input data 103 from upstream data processing 101. DQA 104 performs pre-processing data quality measurement, which can comprise one or more checks and/or measurements, on input data 103 before it is passed to data processing system 105. The pre-processing data quality measurement will be discussed in more detail below. In a case that DQA 104 detects a condition of input data 103, it can issue one or more notification(s) 109 as notification of a detected condition of input data 103, for example. The notification can take any of a number of forms, including a message output to a user or data processing system, a log entry, etc. The notification can include information concerning the data quality measurement which resulted in the condition, or exception, for example.

In addition to performing pre-processing data quality measurement, DQA 104 collects information about input data 103, which can be used to perform data quality measurement for subsequently-received input data 103. As is discussed in more detail below, the information collected can include input data 103, and/or information concerning properties of input data 103. In addition and as discussed below, previously-received input data 103 and/or previously-received output data 107 can be used for historical, benchmark purposes.

Input data 103 can be forwarded to data processing system 105 as input, either by DQA 104 as a gatekeeper, or from upstream data processing system 101. Data processing system 105 receives input data 103 and generates output data 107, which can be forwarded to DQA 104. DQA 104 performs post-processing data quality measurement on output data 107, which can comprise one or more tests or measurements. In one or more embodiments of the present disclosure, such as in a case that DQA 104 acts as a gatekeeper, the post-processing data quality measurement can be performed on output data 107 by DQA 104 before the data is forwarded to one or more other data processing systems downstream of data processing system 105. As is discussed in more detail below, in a case that the post-processing data quality measurement detects a condition, a notification can be generated. In addition and in accordance with one or more embodiments of the disclosure, such condition can result in some or all of the data (e.g., input data 103 or output data 107) not being used by a downstream data processing system, for example.

Figure 2:
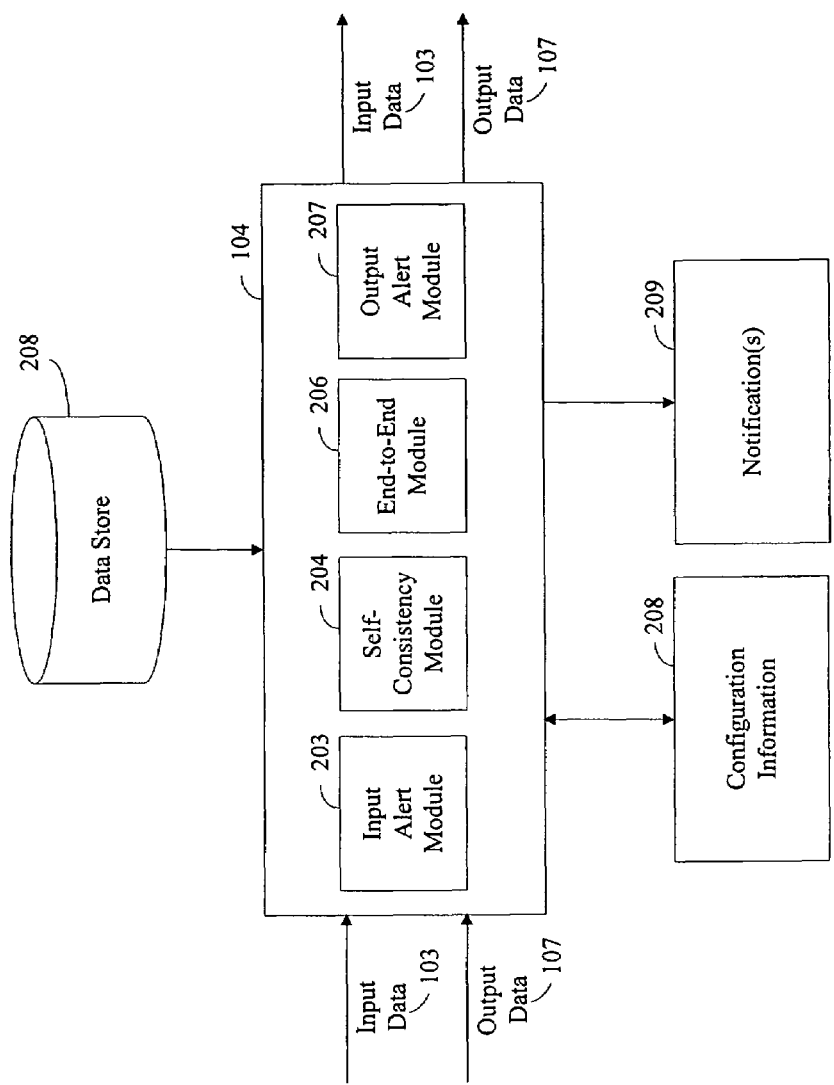
FIG. 2 illustrates components used in measuring data quality in accordance with one or more embodiments of the present disclosure.

FIG. 2 illustrates components used in measuring data quality in accordance with one or more embodiments of the present disclosure.

In a preferred embodiment of the present disclosure, DQA 104 comprises input alert (IA) module 203, self-consistency (SC) module 204, end-to-end (ETE) module 206 and output alert (OA) module 207. While all four of these modules can be used in combination in one or more embodiments of the present disclosure to provide one level of data quality assurance, it should be apparent that in one or more alternate embodiments, other configurations, which involve fewer of the modules, can be used to provide different levels of data quality assurance.

In accordance with one or more embodiments of the present disclosure, IA module 203 and OA module 207 can be used to perform similar data quality measurements, such that the same, or similar measurements, with IA module 203 operating on input data 103 and OA module 207 operating on output data 107.

In accordance with one or more embodiments of the present disclosure, DQA 104 can be configurable to use one or more definable properties corresponding to input data 103 and/or output data 107 to perform pre-processing and/or post-processing data quality measurement. By way of non-limiting example, such properties can include size, value, metric, type, format, interrelationship, name, location, dimension, checksum, cyclic redundancy check (CRC), etc. A property can correspond to input data 103 and/or output data 107 as a whole, or to one or more data items of input data 103 and/or output data 107.

The IA module 203 can be configured in one or more embodiments of the present disclosure to perform pre-processing data quality measurement. For example, IA module 203 can be configured to monitor input data 103 to identify a variance between input data 103 and historical benchmark information corresponding to input data 103. Similarly, OA module 207, which is configured in one or more embodiments of the present disclosure to perform post-processing data quality measurement, can be configured to examine output data 107 against historical benchmark information corresponding to output data 107 to identify a variance between the historical benchmark information and output data 107. By way of an example, a benchmark which can be used in either input data 103, output data 107, or both is size, e.g., file size. Using this example and input data 103, IA module 203 can use file size of input data 103 and a benchmark file size (e.g., a file size of a previously-received input data 103 to identify a variance.

However, it should be apparent that one or both of IA module 203 and OA module 207 can perform data quality measurement without comparison to, or use of, benchmark information. For example, a data item of input data 103 can have an associated value that has little if any variation. In such a case, the data item value can be compared to a threshold without reference to historical benchmark information. As another example, data integrity checks, such as checksum and CRC, can be performed by OA module 207 on output data 107. Of course, it should also be apparent that other types of checks can be performed which need not necessarily involve use of benchmark information. In addition, it should also be apparent that benchmark information can include historical checksum and CRC information, which can be used in data quality measurement.

In accordance with one or more embodiments of the present disclosure, IA module 203 and OA module 207 provide notification 209 of a variance which exceeds a threshold. The threshold can be configurable, and can be an amount or a range, for example. Notification 209 can be in the form of an alert message, which can be displayed on a screen at an operator's computer system, and/or in the form of a log entry, for example. Thus, in one or more embodiments of the present disclosure, a variance can be reported if the variance fails to satisfy a threshold, for example. Alternatively and in one or more embodiments of the present disclosure, IA module 203 and OA module 207 notify of any variance detected.

In one or more alternate embodiments of the present disclosure, IA module 203 and OA module 207 forward input data 103 and output data 107, respectively, to a downstream data processing system (e.g., IA module 203 passes input data 103 to data processing system 105) to be processed by the downstream data processing system.

In or more embodiments of the present disclosure, SC module 204 performs post-processing data quality measurement, and monitors output data 107, e.g., output data 107 which is output by data processing system 105, using one or more predetermined relationships associated with output data 107. Each of the predetermined relationships identifies a connection, or correlation, between two or more properties of output data 107. The two or more data properties of output data 107 are considered to be consistent if the predetermined relationship between the two or more data items is satisfied.

By way of example only, assume that output data 107 comprises data which tracks web page activity and information, including "page view" data, which is used to identify web page viewings, and "click" data, which is used to identify "clicks" (e.g., selection of a hyperlink) in a web page. It is further assumed for sake of this example, that the data includes an identification of a number of unique cookies. In addition and for this example, the data is divided into segments (e.g., four). For example, data can be divided based on a category of user (e.g., a registered user currently logged in, a registered user not currently logged in, a non-registered user, etc.) The following provide sample of relationships between the data, that can be used by SC module 204, in accordance with this example"

$$PVS_0 = PVS_1 + PVS_2 + PVS_3 + PVS_4 \quad (1)$$

$$CL_0 = CL_1 + CL_2 + CL_3 + CL_4 \quad (2)$$

$$Cookie_0 = Cookie_1 + Cookie_2 + Cookie_3 + Cookie_4 \quad (3)$$

Relationship (1) indicates that the total number of page views, $PV_0$, should equal the sum of the subtotals for segment 1 to 4, i.e., $PVS_1$, $PVS_2$, $PVS_3$ and $PVS_4$. Similarly, relationship (2) indicates that the total number of clicks, $CL_0$, should equal the sum of the click segment subtotals, i.e., $CL_1$, $CL_2$, $CL_3$ and $CL_4$. Further, and as shown by relationship (3), $Cookie_0$, the total number of unique cookies across the segments should be equal to the sum of the segment subtotals, i.e., $Cookie_1$, $Cookie_2$, $Cookie_3$ and $Cookie_4$.

ETE module 206 uses predetermined relationships, each of which relates at least one property of input data 103 with at least one property of output data 107. To illustrate, it is assumed that a predetermined relationship indicates that a value property associated with a data item of input data 103 is used to set a value property of multiple data items of output data 107, such that the aggregate of the value of the output data 107 data item is no more than the aggregate of the values of the input data 103 data items. In this example, ETE 206 examines the value properties of these data items of input data 103 and output data 107 to determine whether the predetermined relationship is satisfied.

In the web activity example described above, the following end-to-end relationships can be used by ETE module 206:

$$PVS_0(\text{Input}) = PVS_0(\text{Output}) \quad (4)$$

$$CL_0(\text{Input}) = CL_0(\text{Output}) \quad (5)$$

In the above example, relationships (4) and (5) ensure that there was no loss of, or addition to, the page views and click totals by a data processing system, which processing input data 103 to output output data 107.

In accordance with one or more embodiments of the present disclosure, data store 108 includes predetermined relationships associated with input data 103 and/or output data 107 for use by SC module 204 and ETE module 206. In addition, DQA 104 is coupled to a data store 208, which includes benchmark information. In one or more embodiments of the present disclosure, data store 208 stores the current and at least one prior version of input data 103 and output data 107. In accordance with these embodiments of the present disclosure, DQA 104 uses the stored input data 103 and/or output data 107 to generate the benchmark information concurrent with, or immediately prior to, use of the benchmark information by, for example, either or both of IA module 203 and OA module 207. In accordance with one or more embodiments of the present disclosure, generated benchmark information is stored in data store 208. Thus, in one or more embodiments of the present disclosure, data store 208 includes stored benchmark information in addition to or in place of input data 103 and/or output data 107. In accordance with one or more other embodiments of the present disclosure, data store 208 includes both benchmark information, such as that generated by DQA 104 or received as input to DQA 104, as well as input data 103 and output data 107.

In one or more embodiments of the present disclosure, data store 208 stores threshold information for use by DQA 104. For example, IA module 203 and OA module 207 can use stored threshold information to determine whether or not a variance between current and historical benchmarks is insignificant, or tolerable. In a case that the variance is determined to be significant, DQA 104 can be configured to provide notification (e.g., generated notification in the form of a report or log). In one or more embodiments of the present disclosure, the notification can be used to determine whether or not to process data.

A threshold can be a threshold value, or a threshold range, which has at least an upper and lower value. For example, in a case of a threshold range having an upper and lower value, a notification can be generated when a variance falls outside the threshold range (e.g., the variance is either less than the lower threshold value or greater than the upper threshold value). As a further example and in a case that a threshold value is used, a notification can be generated when a variance exceeds the threshold value. Alternatively and in a case that a threshold value is used, a notification can be generated when a variance falls below the threshold value. In one or more embodiments of the present disclosure, the threshold can be varied (e.g., increased or decreased). In addition and as is discussed in more detail below, in one or more embodiments of the present disclosure, a threshold can be selected from multiple thresholds. A threshold can be defined using historical benchmark information. For example, a threshold can be identified from analysis of variances in previously-received input data 103 or output data 107, in order to identify normal/acceptable variances in the data.

Data store 208 can include configuration information 210 for use by DQA 104. One example of such configuration information 210 comprises information used to determine a retention period for benchmark information, input data 103 and output data 107 stored by data store 208. As another example, configuration information can be used by DQA 104 to determine a type of notification to be used when an exception occurs in either the pre-processing or post-processing measurements. Further still, configuration information can include threshold information (e.g., one or more thresholds). Configuration information can include information which defines one or more measurements used in pre-processing and/or post-processing data quality measurement performed by DQA 104.

It should be apparent that while data store 208 is shown as a single store, multiple instances of data store 208 can be used in one or more embodiments of the present disclosure. Data store 208 can be a local or remote data store. In addition, it should be apparent that DQA 104 can be separate from, or a part of, data processing system 105. Further, while DQA 104 is shown as a single instance, which comprises IA module 203, SC module 204, ETE module 206, and OA module 207, it should be apparent that DQA 104 can comprise multiple instances. Each instance of DQA 104 can comprise all or some of IA module 203, SC module 204, ETE module 206, and OA module 207. For example, DQA 104 can comprise four instances, one for each of IA module 203, SC module 204, ETE module 206 and OA module 207.

It should also be apparent that an instance of DQA 104 can be associated with a data processing system, such as e.g. data processing system 105, and/or DQA 104 can be shared by more than one data processing system.

In one or more embodiments of the present disclosure, output data 107 is provided to DQA 104 when data processing system 105 completes its processing. However, it should be understood that a portion of output data 107 can be provided to DQA 104 as processing of the portion is complete, regardless of whether processing by data processing system 105 as a whole is complete. Furthermore, in one or more embodiments of the present disclosure, some portion of output data 107 can be output at an intermediate point in processing by data processing system 105.

In accordance with one or more embodiments of the present disclosure, the data quality measurement performed by IA module 203, SC module 204, ETE module 206 and/or OA module 207 can use a set of rules, or expressions, which can be part of the configuration information 208, for example. For example, an expression can be used to identify a property, e.g., by name, that is to be examined with respect to the current and previous input data 103 and/or output data 107. In addition, the expression can identify the threshold that is to be used to evaluate whether or not a variance is acceptable, for example.

With regard to SC module 204, a set of expressions, or rules, can be used to express relationships between properties of output data 107, for example. In the case of ETE module 206, a set of rules can be used to express relationships between properties of input data 103 and properties of output data 107, for example.

FIG. 3, which comprises FIGS. 3A to 3E, provides a data quality measurement process flow performed by DQA 104, for example, in accordance with one or more embodiments of the present disclosure. In the example of FIG. 3, DQA 104 comprises each of IA module 203, SC module 204, ETE module 206 and OA module 207. It should be apparent that the modules of DQA 104 can be executed in any order, with respect to each other. In addition, it should be apparent that the modules of DQA 104 can be used independent of each other. Further still, one, two, or all four modules can be used to provide data quality measurement.

Figure 3A:
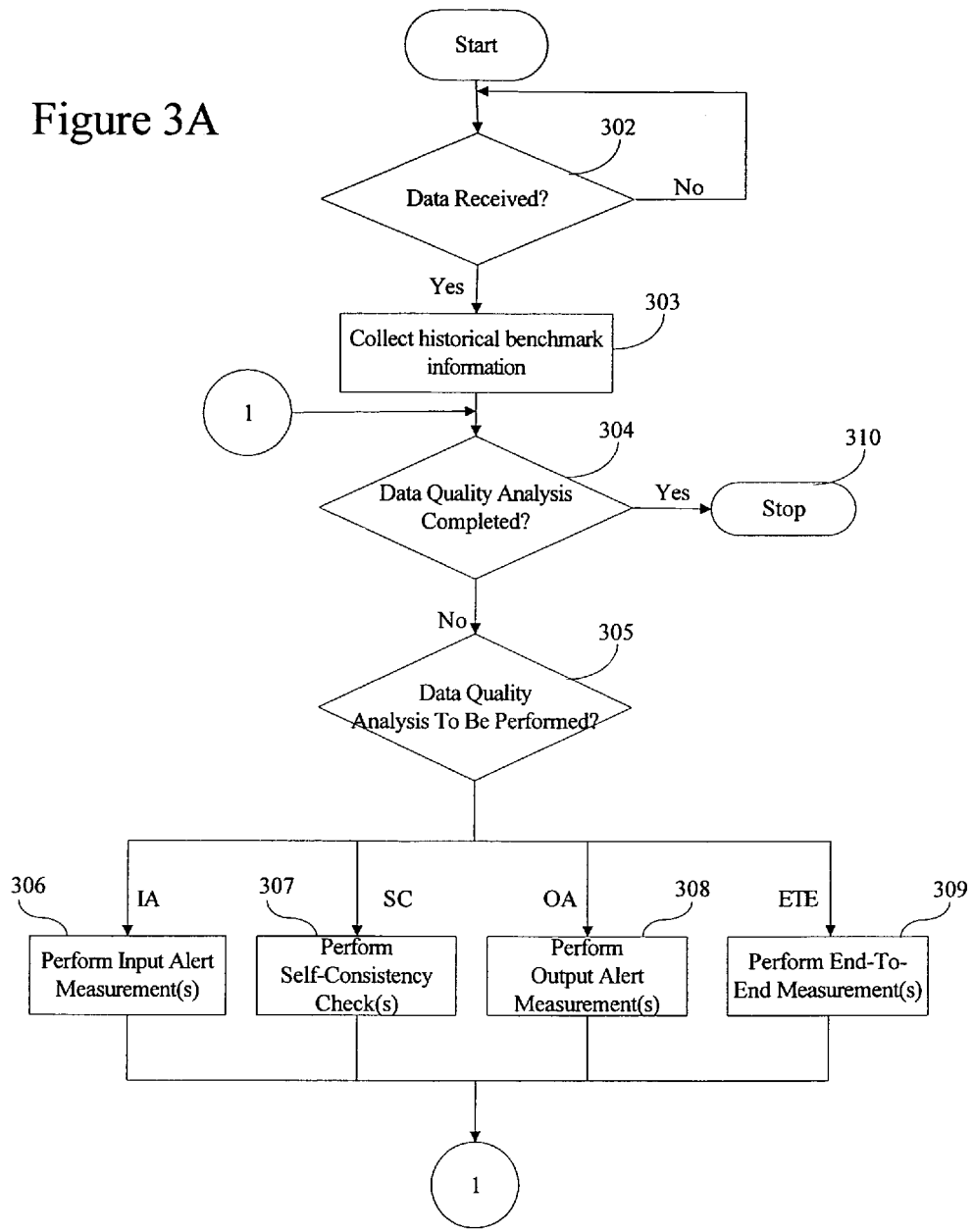

Referring to FIG. 3A, a determination is made, at step 302, whether or not data (e.g., input data 103, output data 107, or both) has been received. If not processing continues at step 302 to await receipt of the data. In a case that data is received, processing continues at step 303 to collect historical benchmark information about the received data.

The historical information can be collected and stored in data store 208, for example. At step 304, a determination is made whether or not data quality measurement has been performed on the received data. If so, processing ends at step 310. In a case that data quality measurement remains to be performed on the received data, processing continues at step 305 to determine what data quality measurement is to be performed.

If it is determined, at step 305, that input alert data quality measurement is to be performed on input data 103, for example, processing continues at step 306. If it is determined that a self-consistency check is to be performed on output data 107, for example, processing continues at step 307 to perform one or more self-consistency checks. Similarly, if it is determined at step 305 that one or more output alert measurements are to be performed, processing continues at step 308. If it is determined at step 305 that one or more end-to-end measurements are to performed using both input data 103 and output data 107, processing continues at step 309. Once the determined type of data quality measurement is performed (e.g., at step 306, 307, 308 or 309), processing continues at step 304 to determine whether another type of data quality measurement remains to be performed. If not processing, ends at step 310. It should be apparent that steps 306, 307, 308 and 309 can be executed in any order, and can be based, for example, on which type of data (e.g., input data 103 or output data 107) is received by DQA 104.

Figure 3B:
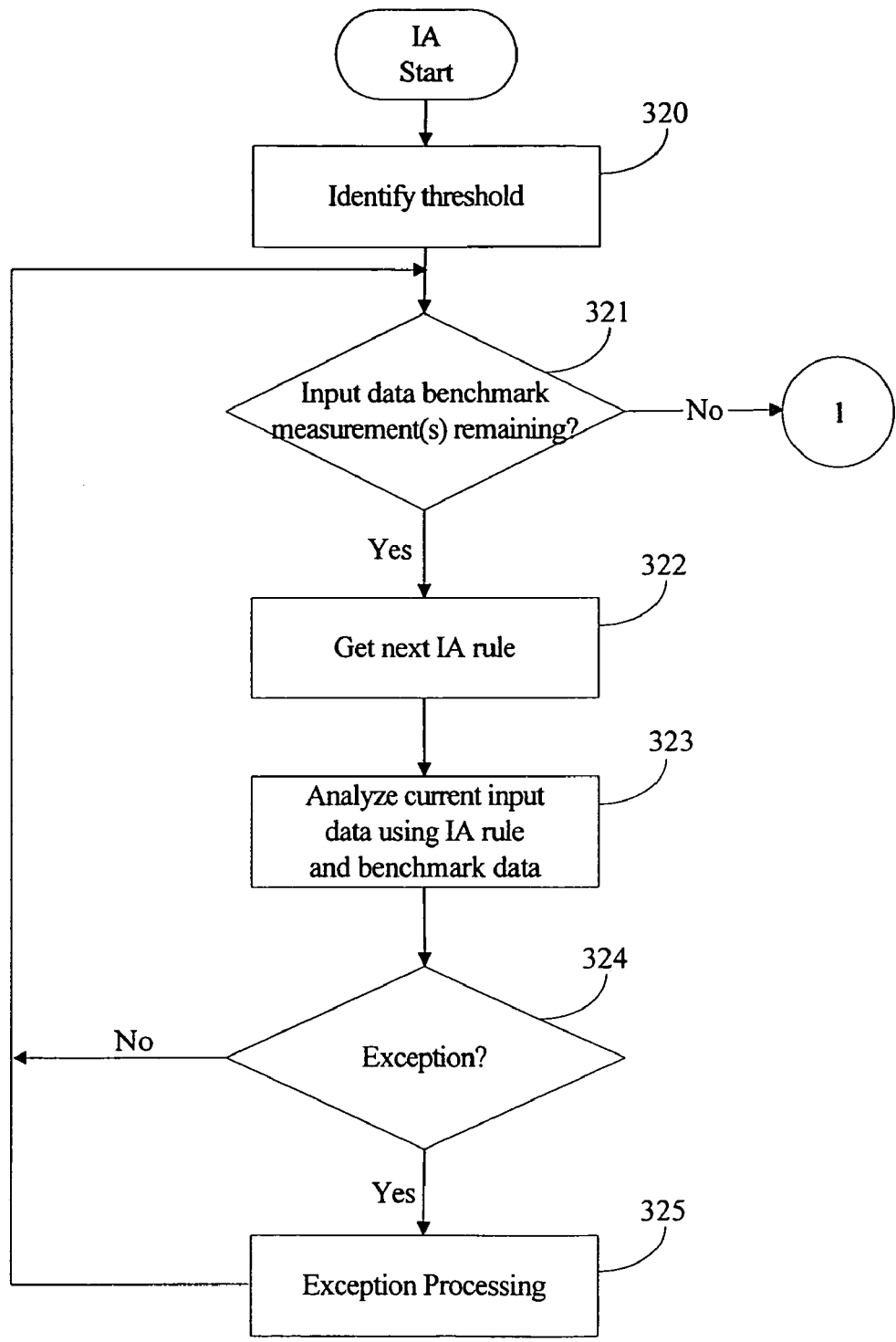

Referring again to step 306 of FIG. 3A, input alert measurements, such as those performed by IA module 203, can measure one or more properties of input data 103 against historical benchmark information corresponding to the one or more properties of input data 103. FIG. 3B provides an example of an input alert measurement process flow, which can be performed by IA module 203, in accordance with one or more embodiments of the present disclosure.

At step 320, one or more thresholds are identified, using a process such as that shown in FIG. 4, which will be described in more detail below. Once at least one threshold has been identified, processing continues at step 321 to determine whether any input alert measurements remain to be processed. If not processing continues at step 304 of FIG. 3A, to perform any remaining data quality measurements, e.g., by SC module 204, ETE module 206 and/or OA module 207. If it is determined at step 321 that at least one input alert measurement remains to be processed, processing continues at step 322 to get the next rule, or expression, which defines an input alert measurement.

At step 323, the current input data is analyzed based on the rule, or other expression of the measurement to be performed, which is obtained in step 322, and benchmark data. At step 324, a determination is made whether or not an exception is raised as a result of the analysis performed in step 323. By way of an example, a value property of input data 103 can be examined against a like value property from previously-received input data 103 to determine what if any variance exists between the value property associated with input data 103 and the value property associated with the previously-received input data 103. If a variance is detected, the variance is compared to a variance threshold associated with the value property to determine whether the variance is tolerable, or allowable. If the variance is not acceptable (e.g., the value properties vary by an amount which exceeds the corresponding threshold), DQA 104 processes the exception at step 325.

As discussed above, in accordance with one or more embodiments of the present disclosure, DQA 104 can be configured to take any number of actions in response to the exception, including but not limited to generating a notification, logging an exception, and/or disallowing use of input data 103, etc. In addition, or as an alternative, DQA 104 can notify data processing system 105 of the outcome of the pre-processing quality measurement, so as to allow data processing system 105 to determine whether or not to use input data 103.

In one or more embodiments of the invention and in addition to generating one or more notifications, in a case that an exception exists, DQA 104 processes the exception and forwards the input data 103 to data processing system 105. In addition, or as an alternative to forwarding the input data 103 to data processing system 105, input data 103 can be forwarded to data processing system 105 from another source, such as an upstream data processing system, and/or data processing system 105 can retrieve the input data 103 from a data store, such as data store 208.

In the example shown in FIG. 3B and in accordance with one or more embodiments of the present disclosure, DQA 104 processes the exception at step 325 and continues processing at step 321 to process any remaining input alert measurements. If an exception is not detected at step 324, processing continues at step 321 to process any remaining input alert measurements.

If it is determined, at step 321 that no more input alert measurements remain, processing continues at step 304 of FIG. 3A to process any remaining data quality measurements (e.g., data quality measurements performed by SC module 204, ETE module 206 and/or OA module 207).

Referring again to FIG. 3A, if it is determined, from steps 304 and 305, that the data quality measurement performed by DQA 104 includes one or more self-consistency checks, processing continues, such that SC module 204 of DQA 104 performs post-processing data quality measurement (e.g., one or more self-consistency checks) on output data 107. FIG. 3D provides an example of a self-consistency measurement process flow, which can be performed by SC module 204, in accordance with one or more embodiments of the present disclosure.

At step 341, a determination is made as to whether or any self-consistency checks remain. If not processing continues at step 304 of FIG. 3A, to perform any remaining data quality measurements, e.g., by IA module 203, ETE module 206 and/or OA module 207. If it is determined at step 341 that at least one self-consistency check remains to be processed, processing continues at step 342 to get the next rule, or expression, which defines a remaining self-consistency check, which is processed at step 343. For example, SC module 204 can examine two or more data item values of output data 107 to determine whether the values of the data items satisfy a predetermined relationship. For example and assuming that output data 107 includes data items A and B and that data item A is related to data item B such that data item A's value should be greater than data item B's value, SC module 204 compares the two data items' values to determine whether or not the relationship is satisfied. It should be apparent that the above example is for purposes of illustration only, and that any relationship can be defined for use by SC module 204.

If it is determined at step 344 that the relationship identified by the predetermined relationship is not satisfied, processing continues at step 345 to process the exception. Regardless of whether or not an exception is raised, and in accordance with one or more embodiments of the present disclosure, processing continues at step 341 to process any remaining self-consistency checks. If it is determined that no self-consistency checks remain to be processed, processing continues at step 304 of FIG. 3A to process any remaining data quality measurements (e.g., data quality measurements performed by IA module 203, ETE module 206 and/or OA module 207).

Figure 3C:
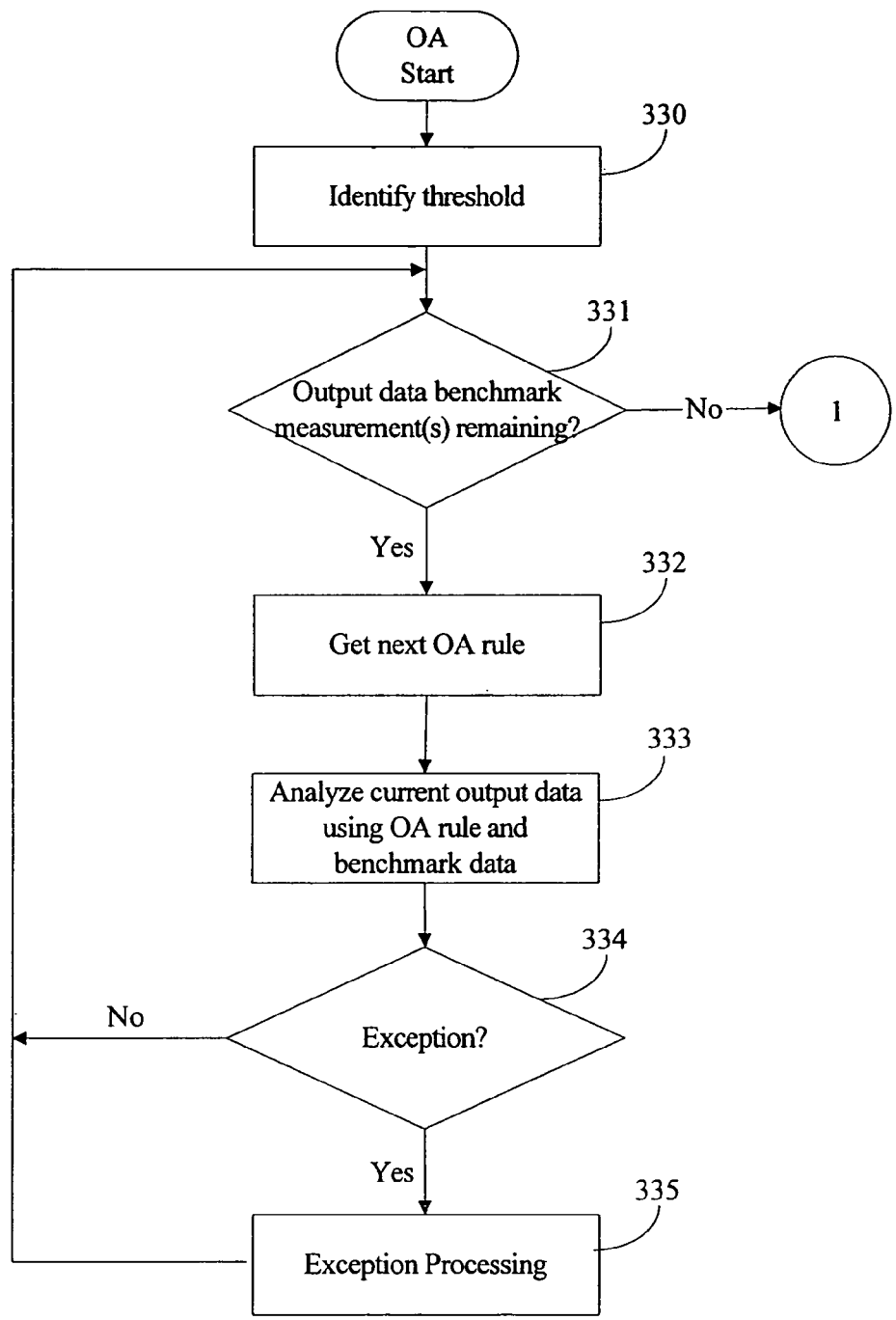
Figure 3D:
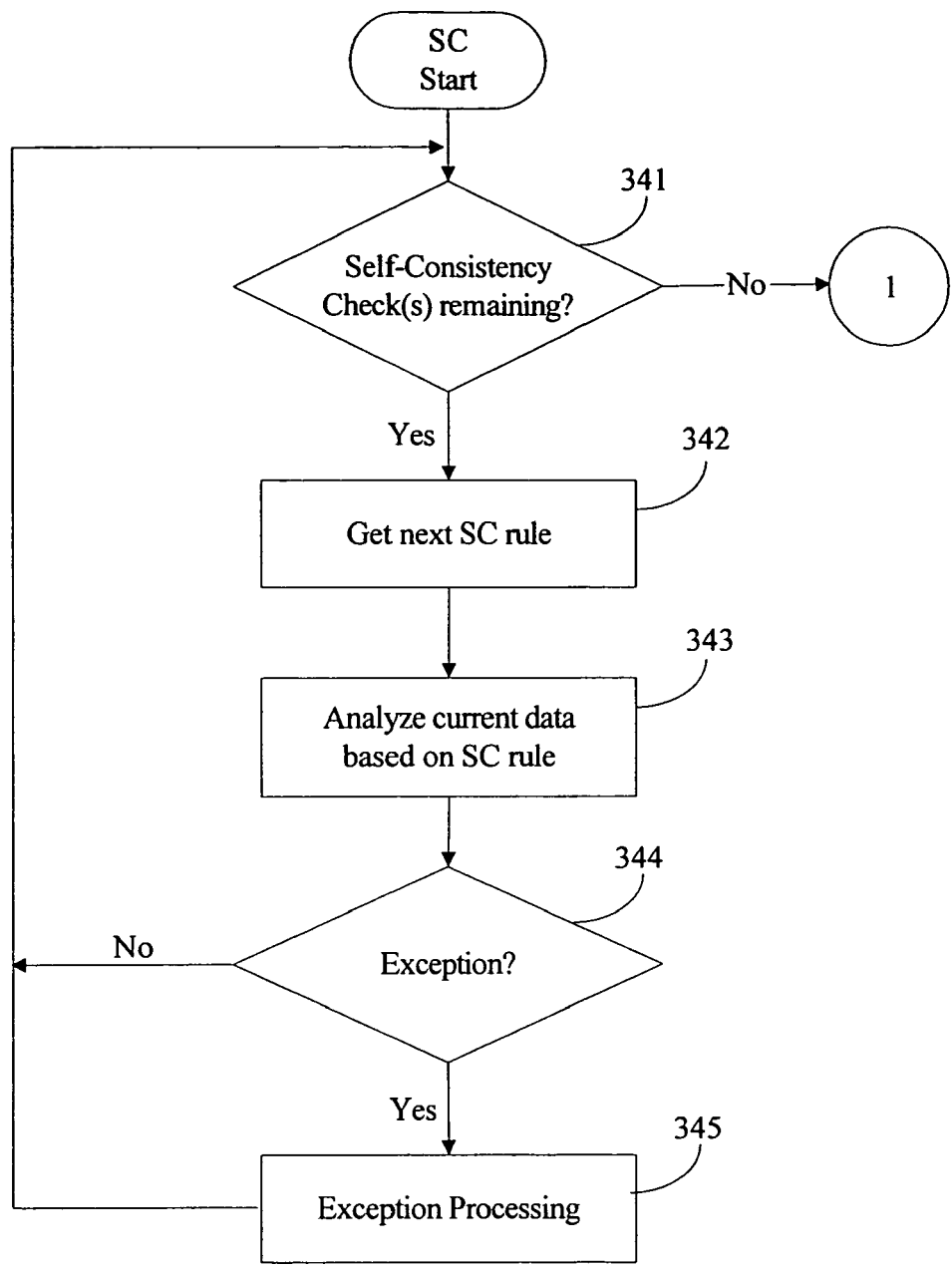
Figure 3E:
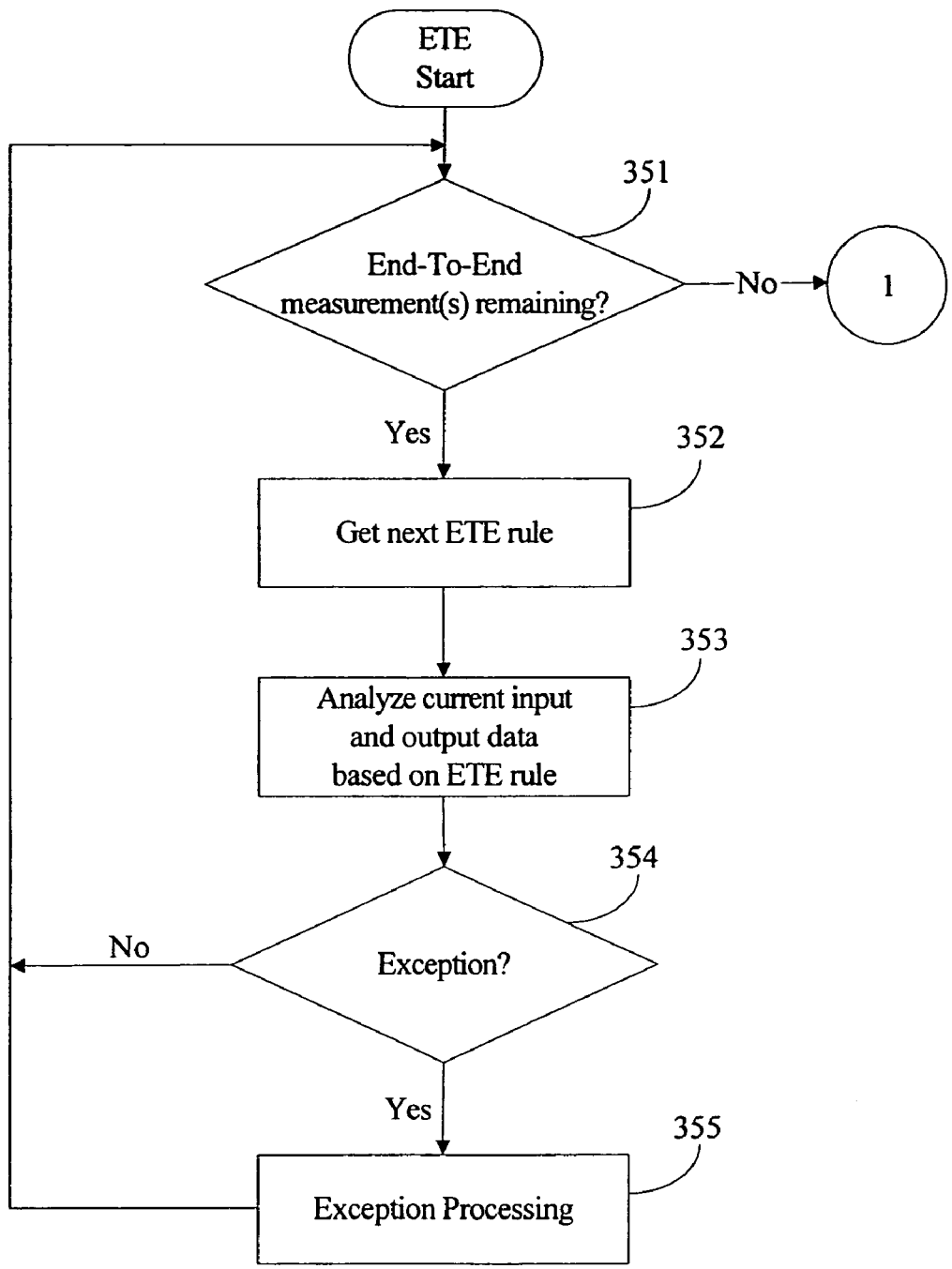

Referring again to FIG. 3A, if it is determined, from steps 304 and 305, that the data quality measurement performed by DQA 104 includes one or more end-to-end checks, processing continues at step 351 of FIG. 3E, which provides an example of an end-to-end measurement process flow, which can be performed by ETE module 206, in accordance with one or more embodiments of the present disclosure In accordance with one or more embodiments of the present disclosure, ETE module 206 of DQA 104 performs post-processing data quality measurement using one or more predetermined relationships between input data 103 and output data 107. For example, ETE module 206 can examine one or more data item values of output data 107 to determine whether they satisfy a predetermined relationship with one or more data item values of input data 103. For example, in a case that data item A of input data 103 represents a gross sales amount and output data 107 data items C and D represent regional sales amounts, a relationship can be defined to determine whether or not the aggregate of output data 107 data items C and D equals the gross sales, data item A of input data 103.

At step 351 of FIG. 3E, a determination is made whether or not any end-to-end measurements remain to be processed. If so, processing continues at step 352 to get the next end-to-end rule, or other expression, of the relationship between data items of input data 103 and output data 107, which is used in step 353 to perform the end-to-end check. At step 354, it is determined whether or not the data items satisfy the relationship identified by the predetermined relationship. If not, processing continues at step 355 to process the exception. Regardless of whether or not an exception exists, and in accordance with one or more embodiments of the present disclosure, processing continues at step 351 to process any remaining end-to-end checks. If it is determined, at step 351 that no more end-to-end checks remain to be processed, processing continues at step 304 of FIG. 3A to process any remaining data quality measurements (e.g., data quality measurements performed by IA module 203, SC module 204, and/or OA module 207).

Referring again to FIG. 3A, if it is determined, from steps 304 and 305, that the data quality measurement performed by DQA 104 includes one or more output alert checks, processing continues at step 330 of FIG. 3C, which provides an example of an output alert measurement process flow, which can be performed by OA module 207, in accordance with one or more embodiments of the present disclosure For example, OA module 207 of DQA 104 performs post-processing data quality measurement based on one or more properties of output data 107 and historical information corresponding to the one or more properties of output data 107.

At step 330, one or more thresholds are identified, using a process such as that shown in FIG. 4, which will be described in more detail below. Once at least one threshold has been identified, processing continues at step 331 to determine whether any output alert measurements remain. If not processing returns to step 304 of FIG. 3A, to perform any remaining data quality measurements, e.g., by IA module 203, SC module 204, and/or ETE module 206. If it is determined at step 331 that at least one output alert measurement remains to be processed, processing continues at step 332 to get the next rule, or expression, which defines an output alert measurement.

At step 333, the current output data 107 is analyzed based on the rule, or other expression of the measurement to be performed, which is obtained in step 332, and benchmark data. At step 334, a determination is made whether or not an exception is raised as a result of the analysis performed in step 333. By way of an example, a size property associated with data item E of output data 107 can be examined against a size property of a corresponding data item E from previously-received output data 107 to determine what if any variance exists. If a variance is detected, the variance is compared to a variance threshold associated with the size property to determine whether the variance is tolerable, or allowable. If the variance does not satisfy the threshold, DQA 104 processes the exception at step 335. As discussed above, in accordance with one or more embodiments of the present disclosure, DQA 104 can be configured to take any number of actions in response to the exception.

In the example shown in FIG. 3C and in accordance with one or more embodiments of the present disclosure, DQA 104 processes the exception at step 335 and continues processing at step 331 to process any remaining output alert measurements. In addition and if an exception is not detected at step 334, processing continues at step 331 to process any remaining output alert measurements.

In the example shown in FIG. 3, DQA 104 collects historical information about input data 103 and output data 107. The historical information, which can include some or all of input data 103 and/or output data 107, can be collected and stored in data store 208, for example. In accordance with one or more embodiments of the invention, DQA 104 can be configured to forego collection of benchmark information (i.e., benchmark information corresponding to either input data 103 and output data 107) in a case that one or more exceptions are encountered during data quality measurement.

As described herein, embodiments of the present disclosure can use a set of rules, or other type of expressions, to define a data quality measurement. Although all of the expressions defined in a rule set can be used to perform data quality measurement according to one or more embodiments of the present disclosure, it might be desirable, under some circumstances, to select a subset of the defined expressions. Use of a subset of the expressions may be desirable to reduce the time and/or resources necessary to perform data quality measurement, for example. Different criteria can be used to select expressions for inclusion in the subset. To illustrate, in a case that focus is on a particular section of the program code executed by data processing system 105, for example, a set of expressions can be selected to perform data quality measurement on a portion of output data 107 processed by that portion of the code executed by data processing system 105.

Furthermore, input data 103 can comprise multiple instances, such as in a case that input data 103 is received from multiple upstream sources, for example. In such a case and in accordance with one or more embodiments of the present disclosure, expressions can be selected to perform pre-processing data quality measurement on all of the input data 103 regardless of the upstream source. However, it is also possible to select input data 103 from less than all of the multiple input data 103 instances for pre-processing data quality measurement by IA module 203. Similarly, it is possible to have multiple instances of output data 107, such as in a case that a different instance of output data 107 is to be processed by different downstream destinations. In such a case, it might be desirable for OA module 207 to perform post-processing data quality measurement on all or some lesser number of instances of output data 107.

In addition and in one or more embodiments of the present disclosure, characteristics associated with input data 103, and/or output data 107, can be used in determining the manner in which DQA 104 performs data quality measurement. For example, DQA 104 can use a characteristic associated with input data 103, and/or output data 107 to select a threshold, which is used by DQA 104, from multiple thresholds. For example, such a characteristic can be whether input data 103, or output data 107, corresponds to a holiday, a weekday, a weekend day, etc. By way of an example, input data 103, as well as the previously-received input data 103, includes sales data for a given day or period, which can vary depending on whether or not the sales occurred on a holiday, or during a holiday period. It might be desirable to be able to select a threshold based on whether the sales data reflects holiday sales data. In accordance with one or more embodiments of the present disclosure, a "holiday threshold" can allow for a greater variance between the current input data 103 and the previously-received input data 103, so as to allow for an increase/decrease in sales over a holiday period.

FIG. 4 provides an exemplary process flow for selecting a threshold based on at least one data characteristic in accordance with one or more embodiments of the present disclosure. At step 401, a characteristic of the current data is determined. For example, a date corresponding to current data is determined. The date may be determined from information included in the current data (e.g., current input data 103 or current output data 107), or from information which accompanies the current data, for example.

At step 402, a similar characteristic of previously-received data (e.g., previously-received input data 103 or previously-received output data 107) is determined, using information which accompanies or is part of previously-received data, for example. For example and assuming the characteristic determined at step 401 is a date, a date corresponding to the previously-received data is determined at step 402. At step 403, the determined characteristic of the current data is examined relative to the same characteristic associated with previously-received data. For example and in accordance with one or more embodiments of the present disclosure, date information corresponding to the current and previously-received data is examined to determine whether either date corresponds to a holiday. Such a determination can use data identifying holidays maintained for a period of years and geographic locations in data store 208, for example.

If it is determined, at step 404, based on examination of the data characteristics of the current and previously-received data, that a threshold other than a default threshold should be selected, processing continues at step 405 to select a threshold based on the determined data characteristics. Using the example of a holiday/non-holiday as a data characteristic, in a case that a date associated one or the other, or both, of the current and previously-received data corresponds to a holiday, a threshold can be selected which corresponds to a holiday at step 404. Otherwise, a "non-holiday" threshold can be selected at step 405.

If it is determined, at step 404 and based on the outcome of examination of the data characteristics of the current and previously-received data, that a default threshold can be used, processing continues, at step 406, to select an appropriate threshold (e.g., to use the default threshold). That is, for example and in accordance with one or more embodiments of the present disclosure, a non-holiday threshold can be selected when both the current data and the previously-received data are determined to not correspond to a holiday.

Once a threshold is selected, it can be used, for example, to determine whether or not a variance detected between the current data and the previously-received data is acceptable, as discussed herein in accordance with one or more embodiments of the present disclosure.

In accordance with one or more embodiments of the present disclosure, the process flow depicted in FIG. 4 can be used to select a threshold for use with input data 103 or output data 107. The selected threshold can be used by one or more of IA module 203, SC module 204, ETE module 206 and OA module 207 during data quality measurement.

FIG. 7, which comprises FIGS. 7A and 7B, provides pseudocode implementation exemplars in accordance with one or more embodiments of the present disclosure.

More particularly, FIG. 7A provides a pseudocode implementation exemplar, which selects a threshold, based at least in part on an data associated with input data 103, and performs input alert data quality measurement on input data 103 using the selected threshold and a file size property of input data 103.

In the example of FIG. 7A, a threshold is selected based on whether or not a date associated with current or previously-received input data 103 corresponds to a holiday. In addition and in the example of FIG. 7A, a deviation in the file sizes associated with data files containing current and previously-received input data 103 is determined (e.g., using a computed absolute deviation), and the determined deviation is compared to a maximum threshold (e.g., 0.1 for "non-holiday data" or 0.25 for "holiday data") to determine whether or not an exception exists. If an exception exists, a notification is generated. In one or more embodiments of the present disclosure, such an exception can result in termination of further data quality measurement by DQA 104.

Referring to FIG. 7B, pseudocode is provided which operates to perform output alert data quality measurement on output data 107 using a selected threshold, which is selected using a date characteristic associated with output data 107, and a property of output data 107 (e.g., value property, or number of page views). In the example of FIG. 7B, a threshold is selected based on whether or not a date associated with current or previously-received output data 107 corresponds to a holiday. In this example, the "non-holiday" (or default) threshold and the "holiday" threshold are the same, i.e., 0.5. In addition and in the example of FIG. 7B, a deviation in the number of page views identified by current and previously-received output data 107 is determined, and the determined deviation is compared to a threshold (e.g., 0.5 for "non-holiday data" and for "holiday data") to determine whether or not an exception exists. If an exception exists, a notification is generated. In one or more embodiments of the present disclosure, such an exception can result in termination of further data quality measurement by DQA 104.

FIG. 5 provides a view of a data processing stream in accordance with one or more embodiments of the disclosure. Data processing stream 500 comprises upstream data processing 501, which can include any number of data processing systems 511. Downstream data processing 502 can comprise any number of data processing systems 512, which are configured to process data output from upstream data processing 501. IA modules 503, which can comprise any number of modules, perform pre-processing data quality measurement on data output by data processing system 511. Downstream data processing 502 processes the input data to generate output data, which is subjected to post-processing data quality measurement by any number of OA modules 507, SC modules 504, and ETE modules 506, each of which can perform post-processing data quality measurement as discussed herein.

FIG. 6, which comprises FIGS. 6A to 6C, show data processing stream and/or data quality measurement arrangements in accordance with one or more alternate embodiments of the present disclosure.

In the example of FIG. 5, data processed and output by upstream data processing 501 is analyzed by a number of IA modules 503. However, it should be apparent that the output data can be analyzed by one or more instances of IA module 503 and/or OA module 507, before it becomes input to downstream data processing 502. FIG. 6A provides an example of an arrangement in which data generated by upstream data processing 501 is analyzed by both IA module 503 and OA module 507 prior to the data being processed by downstream data processing system 502. In the example, IA module 503 and OA module 507 are in series. However, it should be apparent that the IA module 503 and OA module 507 can be in arranged in parallel. In addition, and as shown in FIG. 6B, data quality measurement performed by IA module 503 and OA module 507 can be combined in an Input/Output Alert (I/OA) module 615, which performs both pre-processing and post-processing data quality measurement on data output by data processing system 511 prior to its input to data processing system 512.

Referring again to FIG. 5, ETE module 506 performs post-processing data quality measurement using data input to data processing system 512 and data output by data processing system 512. In other words and with reference to the example shown in FIG. 5, the post-processing data quality measurement performed by ETE module 506 for data processing system 512 uses data input to, and data output by, data processing system 512. However, it should be apparent that ETE module 506 can involve data from an upstream data processing system as well as data from a downstream data processing system. FIG. 6C provides an example of end-to-end data quality measurement which uses data input to an upstream data processing system and data output be a downstream data processing system in accordance with one or more embodiments of the present disclosure. In the example shown in FIG. 6C, ETE module 606 uses predetermined relationships between properties of input data of data processing system 511 of upstream data processing 501 and data output by data processing system 512 of downstream data processing 502.

It should be apparent that embodiments of the present disclosure can be used to perform pre-processing and/or post-processing data quality measurement on data processed by any type application. For example, embodiments of the present disclosure can be used in conjunction with data processing systems with application in areas such as, but not limited to, data warehousing, marketing, accounting, medical, defense, behavior analysis, statistical analysis, etc.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

We claim:

1. A data quality measurement method for use in a data processing stream comprising at least one upstream data processing system, which outputs data for use by at least one downstream data processing system, the method comprising:

validating data processed by an upstream data processing system prior to processing of the data by a data processing system downstream of the upstream data processing system, such that at least one property of the upstream data is validated; and performing validation on data processed by the downstream data processing system, comprising:

validating at least one data item from the processed data using a predefined relationship between the at least one data item from the processed data and at least one data item from the upstream data; and validating two or more data items from the processed data using a predefined relationship between the two or more data items.

2. The method of claim 1, further comprising:

validating the data processed by the downstream data processing system prior to forwarding the processed data to another downstream data processing system, such that at least one property of the processed data is validated.

3. The method of anyone of claims 1 and 2, wherein at least one of the validating steps uses one or more rules selected from a rule set.

4. The method of claim 1, wherein the validating data processed by an upstream data processing system uses benchmark information which corresponds to previous upstream data, the step further comprising:

determining a deviation between a property of the upstream data and a corresponding property from the previous upstream data; and determining whether the determined deviation is acceptable using a predefined threshold corresponding to the upstream data property.

5. The method of claim 4, wherein in a case that the determined deviation is unacceptable, the method further comprises the step of:

generating an alert as notification that the determined deviation exceeds the predefined threshold.

6. The method of claim 4, wherein the predefined threshold is selected from multiple predefined thresholds.

7. The method of claim 6, wherein the multiple predefined thresholds comprise a first and a second threshold, wherein the first threshold is selected in a case that either the upstream data or the previous upstream data is associated with a holiday, and wherein the second threshold is selected in a case that neither the upstream data nor the previous upstream data is associated with a holiday.

8. The method of claim 1, wherein the at least one property of the upstream data comprises a size property, and wherein the benchmark comprises a corresponding size property of the previous upstream data.

9. The method of claim 1, wherein the at least one property of the upstream data comprises a value property, and wherein the benchmark comprises a corresponding value of the previous upstream data.

10. A data quality measurement method for use in a data processing stream comprising at least one upstream data processing system, which outputs data for use by at least one downstream data processing system, comprises the steps of:
   performing a pre-processing data quality measurement on upstream data comprising comparing at least one property of the upstream data to a benchmark corresponding to the at least one property of the upstream data;
   performing a processed data quality measurement on data resulting from processing the upstream data, the processed data quality measurement comprising:
      comparing at least one property of the resulting data with a benchmark corresponding to the at least one property of the resulting data;
      validating at least one resulting data item using a predefined relationship between the at least one resulting data item and at least one upstream data item; and
      validating two or more resulting data items using a predefined relationship between the two or more resulting data items.

11. The method of claim 1, wherein one or more of the validating steps use a rule set which comprises at least one measurement rule, which defines a measurement to be performed.

12. The method of claim 1, wherein the benchmark corresponds to the at least one property of previous upstream data, the step of performing the pre-processing data quality measurement comprises:
   determining a deviation between the at least one property of the upstream data and the at least one property of previous upstream data; and
   determining whether the determined deviation is acceptable using a predefined threshold corresponding to the at least one property of the upstream data.

13. The method of claim 3, wherein in a case that the determined deviation is unacceptable, the method further comprises the step of:
   generating an alert as notification that the determined deviation exceeds the predefined threshold.

14. The method of claim 3, wherein the predefined threshold is selected from multiple predefined thresholds.

15. The method of claim 5, wherein the multiple predefined thresholds comprise a first and a second threshold, wherein the first threshold is selected in a case that either the upstream data or the previous upstream data are associated with a holiday, and wherein the second threshold is selected in a case that neither the upstream data nor the previous upstream data are associated with a holiday.

16. The method of claim 1, wherein the at least one property of the upstream data comprises data size, and wherein the benchmark comprises a data size of previous upstream data corresponding to the upstream data.

17. The method of claim 1, wherein the at least one property of upstream data comprises a value of the upstream data, and wherein the benchmark comprises a value of previous upstream data corresponding to the upstream data.

18. A data quality measurement device for use in a data processing stream, the data processing stream comprising at least one upstream data processing system, which outputs data for use by at least one downstream data processing system, the method comprising:
   an alert module configured to validate data processed by an upstream data processing system prior to processing of the data by a data processing system downstream of the upstream data processing system, such that at least one property of the upstream data is validated;
   an end-to-end module configured validate at least one data item from data processed by the downstream data processing system, the processed data using a predefined relationship between the at least one data item from the processed data and at least one data item from the upstream data; and
   a self-consistency module configured to validate two or more data items from the processed data using a predefined relationship between the two or more data items.

19. The device of claim 18, further comprising:
   a second alert module configured to validate the data processed by the downstream data processing system prior to forwarding the processed data to another downstream data processing system, such that at least one property of the processed data is validated.

20. The device of any one of claims 18 and 19, wherein at least one of the modules is configured to use one or more rules selected from a rule set.

21. The device of claim 18, wherein the alert module configured to validate data processed by an upstream data processing system uses benchmark information which corresponds to previous upstream data, the alert module further comprising:
   a first comparator configured to determine a deviation between a property of the upstream data and a corresponding property from the previous upstream data; and
   a second comparator configured to determine whether the determined deviation is acceptable using a predefined threshold corresponding to the upstream data property.

22. The device of claim 21, further comprising:
   an alert generator configured to generate an alert as notification that the determined deviation exceeds the predefined threshold.

23. The device of claim 22, further comprising:
   a threshold selector configured to select the predefined threshold from multiple predefined thresholds.

24. The device of claim 23, wherein the multiple predefined thresholds comprise a first and a second threshold, wherein the threshold selector is configured to select the first threshold in a case that either the upstream data or the previous upstream data is associated with a holiday, and the threshold selector is configured to select the second threshold in a case that neither the upstream data nor the previous upstream data is associated with a holiday.

25. The device of claim 18, wherein the at least one property of the upstream data comprises a size property, and wherein the benchmark comprises a corresponding size property of the previous upstream data.

26. The device of claim 18, wherein the at least one property of the upstream data comprises a value property, and wherein the benchmark comprises a corresponding value of the previous upstream data.

* * * * *